(12) United States Patent
Kirn

(10) Patent No.: US 6,989,656 B2
(45) Date of Patent: Jan. 24, 2006

(54) FLYBACK CONVERTER LINEARIZATION METHODS AND APPARATUS

(75) Inventor: Larry Kirn, East Lansing, MI (US)

(73) Assignee: JAM Technologies, LLC, Boston, MA (US)

( * ) Notice: Subject to any disclaimer, the term of this patent is extended or adjusted under 35 U.S.C. 154(b) by 29 days.

(21) Appl. No.: 10/437,318

(22) Filed: May 13, 2003

(65) Prior Publication Data

US 2004/0032240 A1 Feb. 19, 2004

Related U.S. Application Data

(60) Provisional application No. 60/380,437, filed on May 13, 2002.

(51) Int. Cl.
*G05F 1/613* (2006.01)

(52) U.S. Cl. ...................................................... 323/222
(58) Field of Classification Search ................. 323/222
See application file for complete search history.

(56) References Cited

U.S. PATENT DOCUMENTS

| | | | | |
|---|---|---|---|---|
| 5,394,076 A | * | 2/1995 | Huykman | 323/222 |
| 5,565,761 A | * | 10/1996 | Hwang | 323/222 |
| 5,608,613 A | | 3/1997 | Jansen | 363/21 |
| 5,751,139 A | * | 5/1998 | Jordan et al. | 323/222 |
| 6,166,527 A | * | 12/2000 | Dwelley et al. | 323/222 |
| 6,194,880 B1 | * | 2/2001 | Fraidlin et al. | 323/222 |
| 6,326,774 B1 | * | 12/2001 | Mueller et al. | 323/222 |
| 6,348,781 B1 | * | 2/2002 | Midya et al. | 323/224 |
| 6,580,253 B2 | * | 6/2003 | Kanakubo et al. | 323/222 |
| 6,690,142 B2 | * | 2/2004 | Hendrix | 323/222 |

* cited by examiner

*Primary Examiner*—Jeffrey Sterrett
(74) *Attorney, Agent, or Firm*—Gifford, Krass, Groh, Sprinkle, Anderson & Citkowski, PC

(57) ABSTRACT

A method and circuitry are disclosed that provide for linear operation of a flyback converter through zero output. Broadly, the preferred embodiment enforces a minimum control pulse width thereby isolating energy derived thereby from the eventual load, and dissipating the energy from the minimum control pulse width. The net effect is linear operation inclusive of zero output.

4 Claims, 2 Drawing Sheets

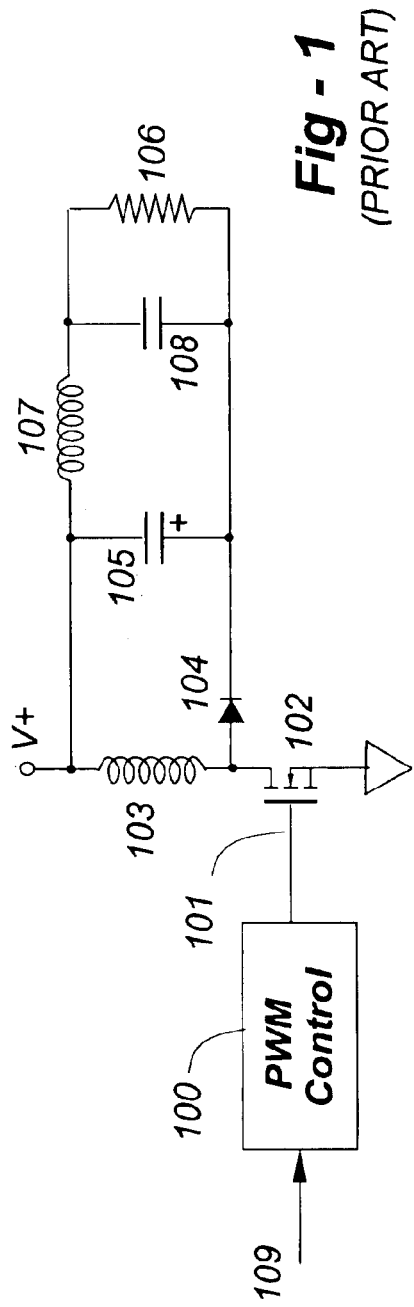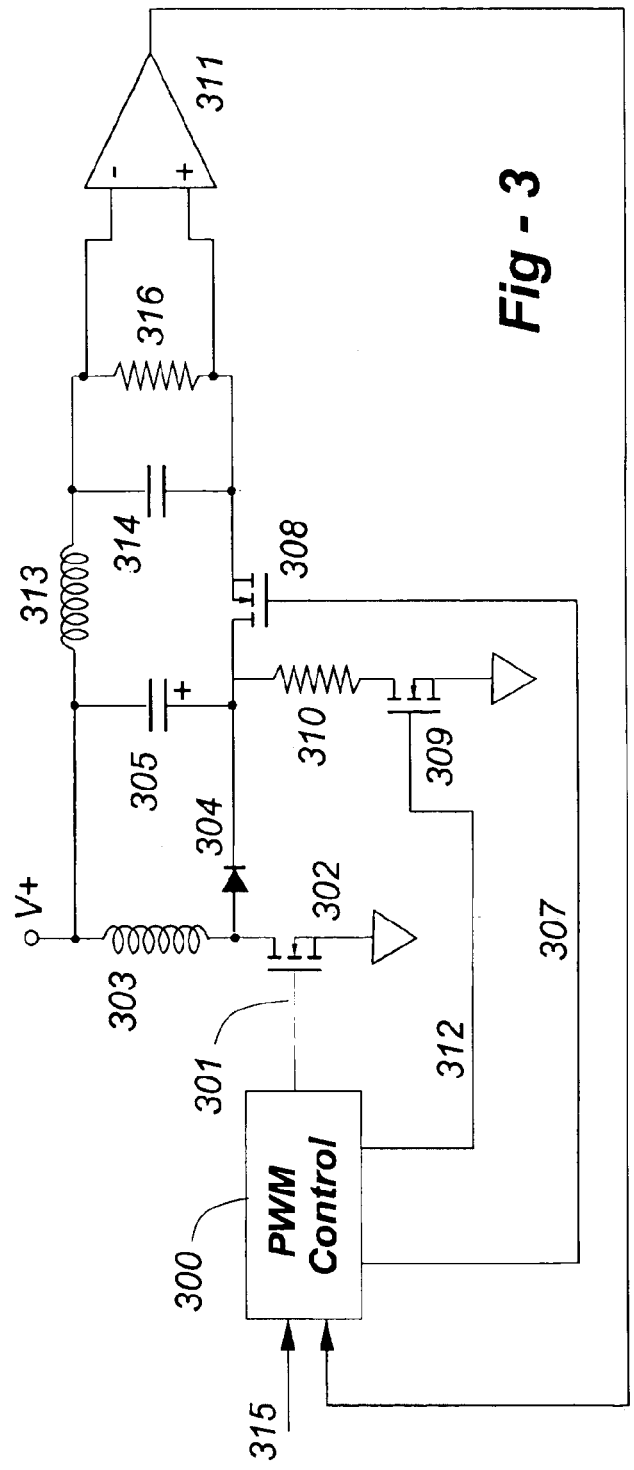

FLYBACK CONVERTER LINEARIZATION METHODS AND APPARATUS

REFERENCE TO RELATED APPLICATION

This application claims priority from U.S. Provisional Patent Application Ser. No. 60/380,437, filed May 13, 2002, the entire content of which is incorporated herein by reference.

FIELD OF THE INVENTION

This invention relates generally to switch-mode power supplies and DC-DC converters and, more particularly, to flyback converters.

BACKGROUND OF THE INVENTION

A DC-to-DC converter is a device that accepts a DC input voltage and produces a DC output voltage. Typically the output produced is at a different voltage level than the input. In addition, DC-to-DC converters are used to provide noise isolation, power bus regulation, etc. Many popular DC-to-DC topologies are based upon flyback converters, which incorporate an inductor to provide voltage boost and usually implemented in boost or buck/boost topologies.

Although flyback converters can be controlled in a linear fashion through a broad range, this range does not include the regime approaching zero output. As switching delays of the switching element used become significant in relation to the commanded pulse width, severe deviations from linear operation occur. Linear operation of flyback converters is, however, sometimes desired inclusive of zero output. A need exists to thus extend the operating range.

SUMMARY OF THE INVENTION

A method and circuitry are disclosed that provide for linear operation of a flyback converter through zero output. Broadly, the preferred embodiment enforces a minimum control pulse width thereby isolating energy derived thereby from the eventual load, and dissipating the energy from the minimum control pulse width. The net effect is linear operation inclusive of zero output.

BRIEF DESCRIPTION OF THE DRAWINGS

FIG. 1 shows a typical flyback converter in a buck/boost configuration;

FIG. 3 shows a preferred embodiment of the present invention; and

DETAILED DESCRIPTION OF THE INVENTION

Figure 4:
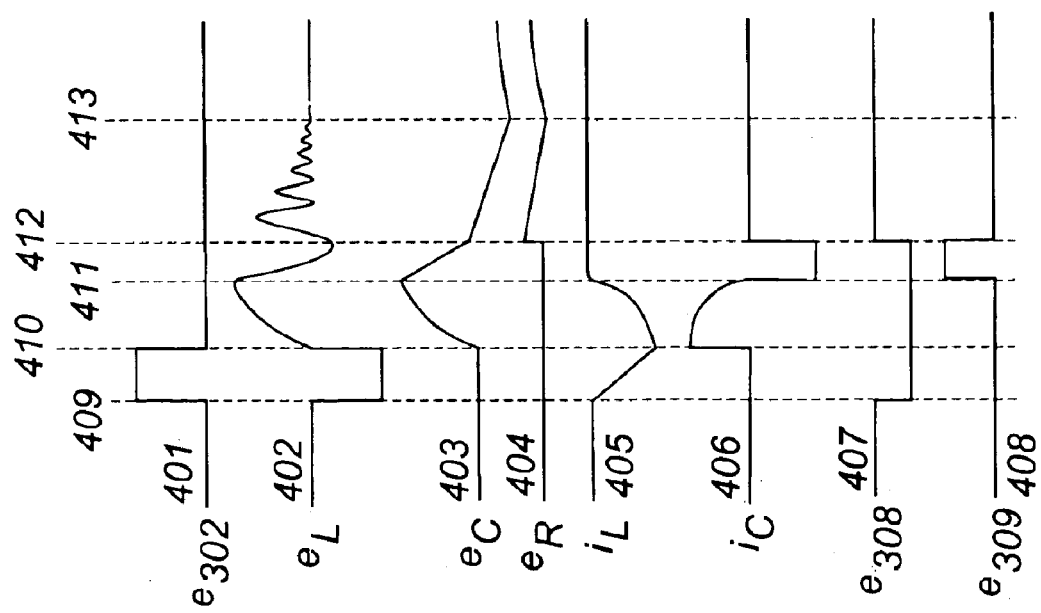
FIG. 4 shows control, as well as voltage, and current waveforms of the inductor and capacitor in the circuit of FIG. 3.

Referring now to FIG. 1, prior-art pulse-width modulation (PWM) control circuit 100 provides a control pulse width 101 to switching device 102, which, when energized, charges inductor 103. At release of pulse width 101, switching device 102 ceases sinking current into inductor 103, which then, in attempting to maintain its previous current, sources a voltage to the anode of diode 104. Diode 104 conducts this voltage into one terminal of both capacitor 105 and load resistance 106. The second terminals of capacitor 105 and load resistor 106 are connected to the positive supply rail. Capacitor 105 serves to limit the peak of the flyback voltage thus generated, while resistor 106 dissipates the majority of its energy.

Figure 2:
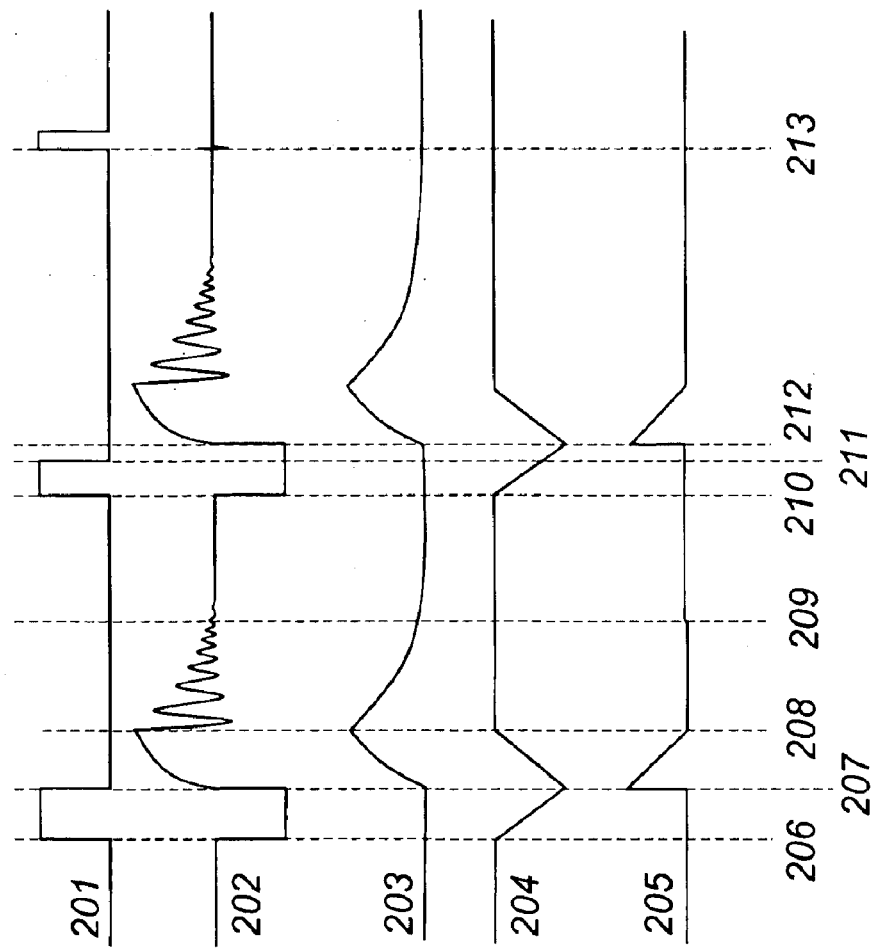
FIG. 2 shows control, as well as voltage and current waveforms of the inductor and capacitor in the circuit of FIG. 1.

Referring now to FIG. 2, voltage trace 201 shows control pulse width 101 of FIG. 1, voltage trace 202 and current trace 204 show their respective characteristics at the lower terminal of inductor 103 of FIG. 1, and voltage trace 203 and current trace 205 show their respective characteristics at the lower terminal of capacitor 105 of FIG. 1.

At time marker 206, control voltage 201 can be seen to go high, energizing switching device 102, which sinks current in inductor 103, indicated by voltage 202 and current 204. At time marker 207, switching device 102 is released, at which point inductor 103 flies back through diode 104 into capacitor 105 and load resistance 106. This flyback action continues until time marker 208, at which point current from inductor 103 into capacitor 105 is depleted, as shown in current traces 204 and 205. Charge transferred into capacitor 105 is now dissipated in resistance 106, until time marker 209, at which point all charge is depleted. This action is visible in voltage 203 and current 205.

At time marker 210, switching device 102 is again energized, but for a much shorter duration than at time marker 206. Although de-energized at time marker 211, switching device does not physically turn off until time marker 212, augmenting voltages 202 and 203 and currents 204 and 205 over those expected. The output 203 is thus becoming non-linear to the control voltage 201. At time marker 213, control voltage 201 is turned on and off before switching device 102 is capable of response. No resultant output is then seen in voltages 202/203 or currents 204/205. The sign of non-linear response is then seen to reverse from time marker 210 to time marker 213, compounding non-linearity approaching zero.

Referring now to FIG. 3, circuitry similar to that of FIG. 1 is seen, with the addition of switching device 308 under the control of control voltage 307, constant current sink comprised of transistor 309 and resistors 310, 311, and 312, under the control of control voltage 314, and operational amplifier 313. Switching device 308, by position, serves to selectively isolate load resistance 306, the eventual output, from the remainder of the circuitry, under control of PWM Controller 300. Transistor 309, in conjunction with resistors 310, 311, and 312, and under control of PWM Controller 300, sinks a constant current from capacitor 305. Operational amplifier 311 provides feedback from the eventual output to PWM Controller 300.

Referring now to FIG. 4, traces 401, 407, and 408 show control voltages 301, 307, and 314, respectively, of FIG. 3. Voltage trace 402 and current trace 405 show their respective characteristics at the lower terminal of inductor 303 of FIG. 3, and voltage trace 403 and current trace 406 show their respective characteristics at the lower terminal of capacitor 305 of FIG. 3. Voltage trace 404 shows the ultimate output across load resistor 306 of FIG. 3.

At time marker 409, switching device 302 is energized by PWM Controller 300, at which point current in inductor 303 builds, indicated in trace 405. At time marker 410, switching device 302 is released, resulting in voltage flyback from inductor 303 into capacitor 305, through diode 304. Note that switching device 308 is disabled during the inductor charge and flyback periods, as indicated in trace 407. The flyback voltage imposed on capacitor 305 is therefore isolated from load resistance 306, transferring no energy thereto. From time marker 410 until time marker 411, energy can be seen to transfer from inductor 303 to capacitor 305 in voltage trace 403 and current traces 405 and 406.

At time marker 411, when charge transfer is complete (indicated by zero inductor current in trace 405), transistor 309 is energized by control voltage 312 from PWM Controller 300. This initiates a constant current sink against the charge previously imparted on capacitor 305, indicated in trace 406. Resultant voltage drop can be observed after time marker 411 in voltage trace 403. After a predetermined time indicated at time marker 412, PWM Controller 300 deasserts control voltage 408, ending the current sink on capacitor 305. Concurrently, at time marker 412, switching device 308 is reasserted by PWM Controller 300 via control voltage 307, (indicated in trace 407) to apply the charge in capacitor 305 to load resistance 306.

The net effect of the foregoing sequence is to isolate circuit operation into inductor charge (between markers 409 and 410), inductor discharge/capacitor charge (between markers 410 and 411), capacitor discharge (between markers 411 and 412), and load dissipation of residual capacitor charge (between markers 412 and 413). Separation of inductor discharge from capacitor discharge is necessary to avoid the increased L/R time constant that would result from concurrent actions. Isolation of the output from load resistance 306 until charge reduction is effected is necessary to facilitate operation to zero, with assistance from filter inductance 313.

Feedback from operational amplifier 311 to PWM controller 300 is shown in FIG. 3 in order to illustrate that the time duration between time markers 411 and 412 of FIG. 4 may be controlled to produce a specific output (presumed zero in the example).

By the method and circuitry disclosed herein, linear operation of a flyback converter is extended to zero.

I claim:

1. Circuitry for linearizing a flyback converter, comprising:

an inductor;

a first electronic switch for charging the inductor;

a capacitor connected to receive energy stored in the inductor during a flyback period;

a current sink for draining at least a portion of the energy stored in the capacitor; and a second electronic switch for transferring the energy remaining in the capacitor after a predetermined period of time to a load.

2. The circuitry of claim 1, further including a pulse-width modulator for generating signals to the electronic switches.

3. A method of linearizing a flyback converter, comprising the steps of:

charging an inductor;

transferring the charge from the inductor to a capacitor;

draining at least a portion of the charge on the capacitor for a predetermined period of time; and transferring the charge remaining on the capacitor to a load.

4. The method of claim 3, including the step of isolating the load until the charge remaining on the capacitor is transferred.

* * * * *

UNITED STATES PATENT AND TRADEMARK OFFICE
CERTIFICATE OF CORRECTION

PATENT NO. : 6,989,656 B2 Page 1 of 1
APPLICATION NO. : 10/437318
DATED : January 24, 2006
INVENTOR(S) : Larry Kirn It is certified that error appears in the above-identified patent and that said Letters Patent is hereby corrected as shown below:

Column 4, line 4 - Replace "converter, compris-" with --converter having a flyback period, compris- --;
Column 4, line 9 - Replace "during a flyback" with --during the flyback--;
Column 4, line 17 - Replace "converter, comprising" with --converter having a flyback period, comprising--; and
Column 4, line 20 - Replace "capacitor;" with --capacitor during the flyback period--.

Signed and Sealed this

Twelfth Day of September, 2006

JON W. DUDAS
*Director of the United States Patent and Trademark Office*